US012335598B2

(12) United States Patent
Hata et al.

(10) Patent No.: US 12,335,598 B2
(45) Date of Patent: Jun. 17, 2025

(54) ELECTRONIC APPARATUS, CONTROL METHOD FOR ELECTRONIC APPARATUS AND STORAGE MEDIUM (71) Applicant: CANON KABUSHIKI KAISHA, Tokyo (JP)

(72) Inventors: Kohei Hata, Kanagawa (JP); Naru Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 173 days.

(21) Appl. No.: 18/360,205

(22) Filed: Jul. 27, 2023

(65) Prior Publication Data
US 2024/0073511 A1    Feb. 29, 2024

(30) Foreign Application Priority Data
Aug. 24, 2022   (JP) ................................. 2022-133643

(51) Int. Cl.
H04N 23/62       (2023.01)
G06F 3/04883     (2022.01)

(52) U.S. Cl.
CPC ......... *H04N 23/62* (2023.01); *G06F 3/04883* (2013.01); *G06F 2203/04806* (2013.01); *G06F 2203/04808* (2013.01)

(58) Field of Classification Search
CPC .. H04N 13/218; H04N 23/62; G06F 3/04845; G06F 3/04883; G06F 2203/04808; G06F 2203/04806
USPC .................................................... 348/333.01
See application file for complete search history.

(56) References Cited

U.S. PATENT DOCUMENTS

| | | | |
|---|---|---|---|
| 11,159,777 B2 * | 10/2021 | Iwata | H04N 13/117 |
| 11,402,655 B2 * | 8/2022 | Iwata | G02B 30/22 |
| 11,553,170 B2 | 1/2023 | Ogawa | |
| 11,589,033 B1 * | 2/2023 | Douglas | H04N 23/67 |
| 11,637,958 B2 * | 4/2023 | Suzuki | H04N 23/90 348/143 |
| 11,683,464 B2 | 6/2023 | Shibagami | |
| 11,835,737 B2 * | 12/2023 | Iwata | G06T 19/006 |
| 11,849,100 B2 * | 12/2023 | Aiba | H04N 13/232 |
| 12,212,732 B2 * | 1/2025 | Kobayashi | H04N 13/139 |
| 2017/0324899 A1 * | 11/2017 | Ohba | H04N 5/265 |
| 2018/0013957 A1 * | 1/2018 | Irie | H04N 23/62 |
| 2018/0192031 A1 * | 7/2018 | Hardison | H04N 13/366 |
| 2019/0020818 A1 * | 1/2019 | Takada | G06T 3/4038 |
| 2020/0213575 A1 | 7/2020 | Shibagami | |
| 2020/0301161 A1 * | 9/2020 | Iwata | G06T 19/006 |

(Continued)

FOREIGN PATENT DOCUMENTS

JP      2020-107270 A      7/2020

Primary Examiner — Pritham D Prabhakher
(74) Attorney, Agent, or Firm — Venable LLP (57) ABSTRACT An electronic apparatus includes a processor; and a memory storing a program which, when executed by the processor, causes the electronic apparatus to: acquire an image in which a first image region captured by using a first optical system and a second image region captured by using a second optical system are disposed side by side; display the first image region and the second image region on a display; receive a predetermined operation from a user; and in a case where the predetermined operation is received from the user, control such that a magnified image region, generated by magnifying a part of the first image region, is displayed instead of the second image region.

11 Claims, 7 Drawing Sheets (56) References Cited

U.S. PATENT DOCUMENTS

| | | | |
|---|---|---|---|
| 2021/0243368 A1* | 8/2021 | Park | H04N 23/951 |
| 2021/0321048 A1 | 10/2021 | Ogawa | |
| 2022/0317471 A1* | 10/2022 | Iwata | G06T 19/006 |
| 2022/0400243 A1* | 12/2022 | Shoji | H04N 23/60 |

* cited by examiner

ELECTRONIC APPARATUS, CONTROL METHOD FOR ELECTRONIC APPARATUS AND STORAGE MEDIUM

BACKGROUND OF THE INVENTION

Field of the Invention

The present invention relates to an electronic apparatus and a control method for the electronic apparatus.

Description of the Related Art

A technique of acquiring images having a wide angle of view with parallax using two optical systems, and displaying the images mapped on a virtual sphere so as to display a three-dimensional virtual reality (VR) image, is known. A dual lens VR camera to capture images having parallax has two optical systems facing a same direction, and can acquire two image regions having parallax by one image capturing operation.

In some dual lens VR cameras, each optical system can capture an image of a wide range that is at least 180° vertically and horizontally (a hemisphere: 90° in all direction from the center of the image). Known methods for displaying a VR image are: "single lens VR display", which performs modification to map a VR image on a virtual sphere and thereby displays one image; and "dual lens VR display", which displays VR image regions for a left eye and for a right eye side by side.

A camera that can replace and use a single lens and dual lens performs the dual lens display by disposing image regions captured by the left eye optical system and the right eye optical system side by side, while images are being captured using the dual lens, so that the state of capturing images using the dual lens is easily recognized.

Japanese Patent Application Publication No. 2020-107270 discloses an electronic apparatus which displays two fisheye image regions (an extracted range and an excluded range), and displays a magnified image region if an instruction to magnify either one of the image regions is received by a pinch operation.

In the dual lens display, two image regions are displayed on one screen, hence selecting a desired subject may be difficult in a case of using a function to select a subject by touching a live view screen (e.g. Touch AF, Touch AE). Even if each of the two image regions, such as the extracted range and the excluded range can be individually magnified and displayed, the user may have difficulty to determine where the magnified subject is located in the entire image.

SUMMARY OF THE INVENTION

The present invention provides an electronic apparatus that can display an image appropriate for use of the function involving subject selection when the dual lens display is performed.

An electronic apparatus includes a processor; and a memory storing a program which, when executed by the processor, causes the electronic apparatus to: acquire an image in which a first image region captured by using a first optical system and a second image region captured by using a second optical system are disposed side by side; display the first image region and the second image region on a display; receive a predetermined operation from a user; and in a case where the predetermined operation is received from the user, control such that a magnified image region, generated by magnifying a part of the first image region, is displayed instead of the second image region.

Further features of the present invention will become apparent from the following description of exemplary embodiments with reference to the attached drawings.

DESCRIPTION OF THE EMBODIMENTS

Embodiment 1

Embodiments of the present invention will be described with reference to the drawings. In Embodiment 1, a case where the electronic apparatus is a digital camera (imaging apparatus) will be described as an example. The digital camera according to Embodiment 1 can acquire one image (dual lens image) including a left image region and a right image region which have predetermined parallax in the lateral direction, and display this image on a display unit (display).

Figure 1A:
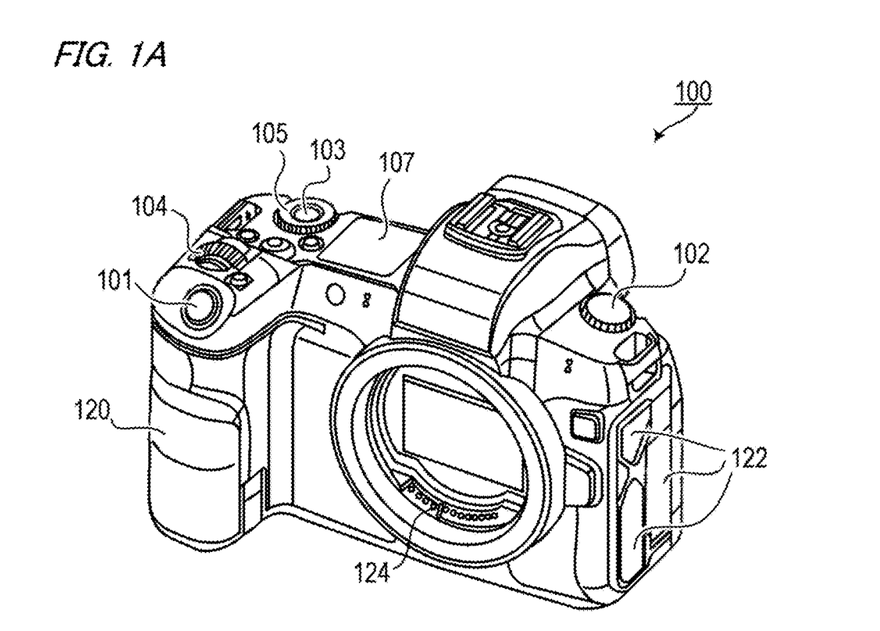
FIGS. 1A and 1B are external views of a camera.
Figure 1B:
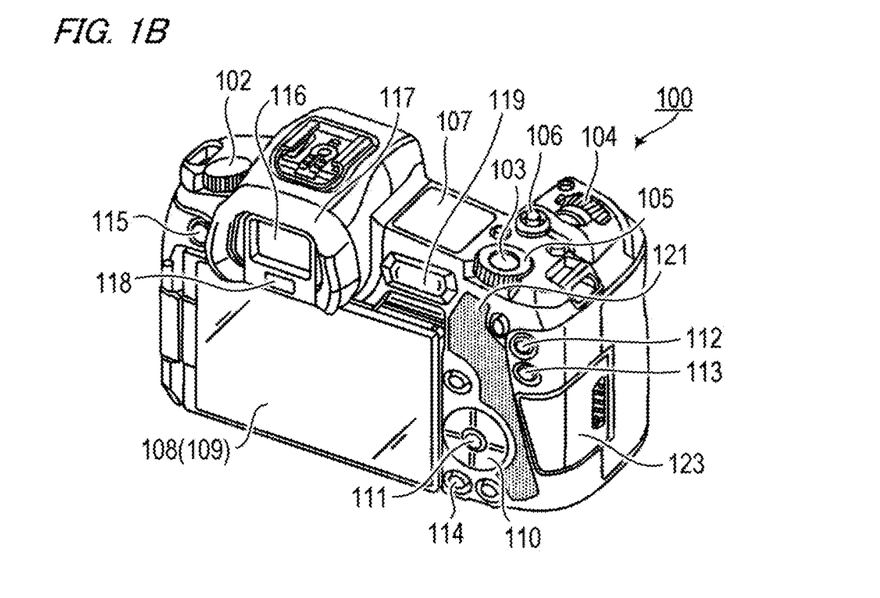

<Hardware Configuration> FIGS. 1A and 1B are external views depicting an example of an appearance of a digital camera (camera) 100 according to Embodiment 1. FIG. 1A is a perspective view of the camera 100 viewed from the front surface side, and FIG. 1B is a perspective view of the camera 100 viewed from the rear surface side.

On the upper surface, the camera 100 includes: a shutter button 101, a power supply switch 102, a mode selecting switch 103, a main electronic dial 104, a sub-electronic dial 105, a moving image button 106, and an outer finder display unit 107. The shutter button 101 is an operation member to instruct image capturing preparation or to instruct image capturing. The power supply switch 102 is an operation member to switch the power supply ON/OFF of the camera 100. The mode selecting switch 103 is an operation member to switch various modes. The main electronic dial 104 is a rotating type operation member to change the set values of the shutter speed, aperture, and the like. The sub-electronic dial 105 is a rotating type operation member for moving a selection frame (cursor), image switching, and the like. The moving image button 106 is an operation member to instruct the start or stop of moving image capturing (recording). The outer finder display unit 107 displays various set modes, such as the shutter speed and aperture.

On the rear surface, the camera 100 includes: a display unit 108, a touch panel 109, a direction key 110, a SET button 111, an AE lock button 112, a magnifying button 113, a reproduction button 114, a menu button 115, an eyepiece 116, an eye approach detection unit 118, and a touch bar 119. The display unit 108 displays images and various information. The touch panel 109 is an operation member to detect a touch operation on a display surface (touch operation surface) of the display unit 108. The direction key 110 is an operation member constituted of keys which can be pressed in up/down/left/right directions respectively (four-direction key). The user can perform an operation in accordance with the position pressed by the direction key 110. The SET button 111 is an operation member that is pressed mainly to determine a selected item. The AE lock button 112 is an operation member that is pressed to lock the exposure state in the image capturing standby state. The magnifying button 113 is an operation member to switch a magnifying mode ON/OFF in the live view display (LV display) in the image capturing mode. When the magnifying mode is ON, the live view image (LV image) is magnified or demagnified by operating the main electronic dial 104. The magnifying button 113 is also used for magnifying a reproduced image or increasing the magnification ratio in the reproduction mode. The reproduction button 114 is an operation member to switch the image capturing mode and the reproduction mode. By pressing the reproduction button 114 in the image capturing mode, the user can start the reproduction mode and display the latest image, out of the images recorded in the recording medium 227 in FIG. 2, on the display unit 108.

The menu button 115 is an operation member that is pressed to display a menu screen, on which various settings can be performed, on the display unit 108. Using the menu screen displayed on the display unit 108, the direction key 110 and the SET button 111, the user can perform various settings intuitively. The eyepiece 116 is a part with which the user contacts their eye and looks into an eyepiece finder (lock-in type finder) 117. Through the eyepiece 116, the user can view an image displayed on an electronic view finder (EVF) 217 in FIG. 2 inside the camera 100. The eye approach detection unit 118 is a sensor to detect whether the eye of the user is approaching the eyepiece 116 (eyepiece finder 117).

The touch bar 119 is a line-shaped touch operation member (line touch sensor) which can receive touch operation. The touch bar 119 is disposed at a position where the touch bar 119 can be touch-operated (touchable) with the right thumb when a grip unit 120 is held with the right hand (held with the little finger, ring finger and middle finger of the right hand, so that the shutter button 101 can be pressed with the right index finger. In other words, the touch bar 119 can be operated in a state where the camera 100 is held such that the shutter button 101 can be pressed any time (image capturing attitude) while the user contacts their eye to the eyepiece finder 117 and looks into the eyepiece 116. The touch bar 119 can receive the tap operation on the touch bar 119 (operation of touching and releasing their finger without moving the touch position within a predetermined period), slide operation to the left or right (operation of moving the touched position while maintaining the touched state), and the like. The touch bar 119 is an operation member that is different from the touch panel 109, and does not include the display function. The touch bar 119 functions as a multi-function bar (M-Fn bar) to which various functions can be assigned, for example.

The camera 100 also includes a grip unit 120, a thumb rest unit 121, a terminal cover 122, a cover 123, a communication terminal 124, and the like. The grip unit 120 is a holding unit that has been formed in a shape by which the user can easily grip with their right hand when the user holds the camera 100. The shutter button 101 and the main electronic dial 104 are disposed at positions where the right index finger can operate in a state of holding the camera 100 by gripping the grip unit 120 with their little finger, ring finger and middle finger. In the same state, the sub-electronic dial 105 and the touch bar 119 are disposed at positions where the right thumb can operate. The thumb rest unit 121 (thumb standby position) is a grip unit disposed on the rear surface side of the camera 100 at a location where the thumb of the right hand holding the grip unit 120 can easily rest when not operating any operation members. The thumb rest unit 121 is made of a rubber material or the like, in order to enhance the holding force (gripping sensation). The terminal cover 122 protects a connector, such as a connector of a connection cable to connect the camera 100 to an external apparatus (external device). The cover 123 covers the slot to store the recording medium 227, so as to protect the recording medium 227 and the slot. The communication terminal 124 is a terminal to communicate with a lens unit (lens unit 200 in FIG. 2, or lens unit 300 in FIG. 3) which is detachable from the camera 100.

Figure 2:
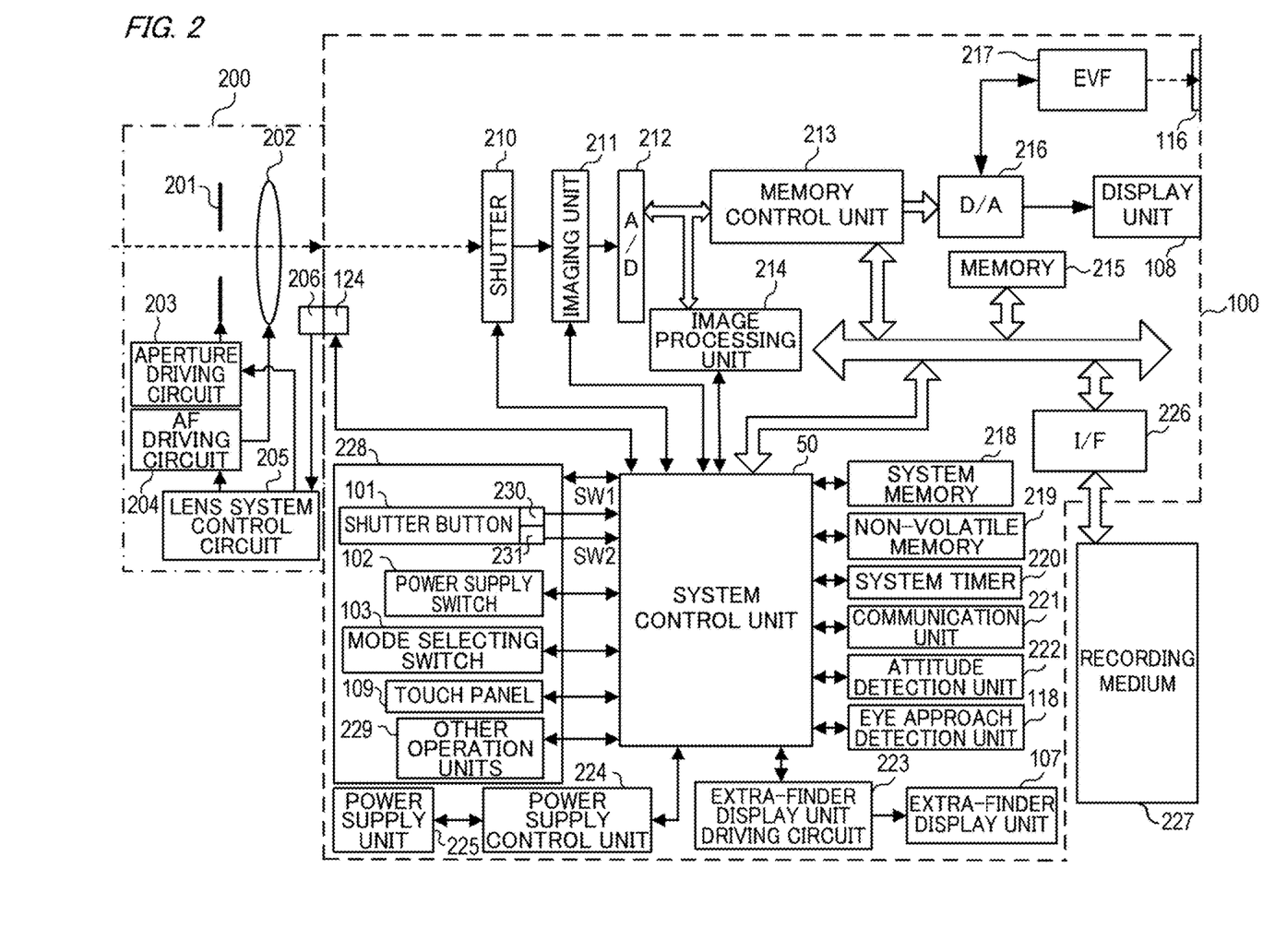
FIG. 2 is a block diagram depicting a configuration of the camera.

<Hardware Configuration Inside Camera> FIG. 2 is a block diagram depicting a configuration of the camera 100. A composing element the same as FIG. 1A or FIG. 1B is denoted with the same reference sign used in FIG. 1A or FIG. 1B, and description of this composing element may be omitted unless necessary. In FIG. 2, the lens unit 200 is installed in the camera 100.

The lens unit 200 will be described first. The lens unit 200 is a type of interchangeable lens unit that is detachable from the camera 100. The lens unit 200 is a single lens unit (monocular lens unit), and is an example of a commonly used lens unit. The lens unit 200 includes an aperture 201, a lens 202, an aperture driving circuit 203, an autofocus (AF) driving circuit 204, a lens system control circuit 205, a communication terminal 206, and the like.

The aperture 201 is configured such that an opening diameter is adjustable. The lens 202 is constituted of a plurality of lenses. The aperture driving circuit 203 controls the opening diameter of the aperture 201 so as to adjust the light quantity. The AF driving circuit 204 drives the lens 202 to perform focusing. The lens system control circuit 205 controls the aperture driving circuit 203, the AF driving circuit 204, and the like, based on instructions from a later mentioned system control unit 50. The lens system control circuit 205 controls the aperture 201 via the aperture driving circuit 203, and performs focusing by changing the position of the lens 202 via the AF driving circuit 204. The lens system control circuit 205 can communicate with the camera 100. Specifically, the lens system control circuit 205 communicates with the camera 100 via the communication terminal 206 of the lens unit 200 and the communication terminal 124 of the camera 100. The communication terminal 206 is a terminal for the lens unit 200 to communicate with the camera 100 side.

The camera 100 will be described next. The camera 100 includes a shutter 210, an imaging unit 211, an A/D convertor 212, a memory control unit 213, an image processing unit 214, a memory 215, a D/A convertor 216, an EVF 217, the display unit 108 and the system control unit 50.

The shutter 210 is a focal plane shutter that can freely control an exposure time of the imaging unit 211 based on the instruction received from the system control unit 50. The imaging unit 211 is an image pickup element (image sensor) constituted of a CCD, a CMOS element, or the like, to convert an optical image into electric signals. The imaging unit 211 may include an imaging plane phase difference sensor, which outputs defocus amount information to the system control unit 50. The A/D convertor 212 converts an analog signal, which is outputted from the imaging unit 211, into a digital signal. The image processing unit 214 performs predetermined processing (e.g. pixel interpolation, resize processing (e.g. demagnification), color conversion processing) on data from the A/D convertor 212 or data from the memory control unit 213. The image processing unit 214 also performs predetermined arithmetic processing using the captured image data, and the system control unit 50 performs exposure control and distance measurement control based on the acquired arithmetic operation result. By this processing, a through-the-lens (TTL) type AF processing, auto exposure (AE) processing, pre-flash emission (EF) processing, and the like are performed. Furthermore, the image processing unit 214 performs predetermined arithmetic processing using the captured image data, and the system control unit 50 performs TTL type auto white balance (AWB) processing based on the acquired arithmetic operation result.

The image data received from the A/D convertor 212 is written to the memory 215 via the image processing unit 214 and the memory control unit 213, or the image data received from the A/D convertor 212 is written to the memory 215 via the memory control unit 213 without using the image processing unit 214. The memory 215 stores image data, which is acquired by the imaging unit 211 and converted into digital data by the A/D convertor 212, and image data to be displayed on the display unit 108 and the EVF 217. The memory 215 has a storage capacity that is sufficient for storing a predetermined number of still images and a predetermined duration of moving images and sounds. The memory 215 also plays a role of a memory for displaying images (video memory).

The D/A convertor 216 converts image data for display, which is stored in the memory 215, into analog signals, and supplies the analog signals to the display unit 108 and the EVF 217. Thus the image data for display, which is written to the memory 215, is displayed on the display unit 108 and the EVF 217 via the D/A convertor 216. The display unit 108 and the EVF 217 perform display in accordance with the analog signals received from the D/A convertor 216. The display unit 108 and the EVF 217 are displays, such as an LCD and organic EL, for example. The digital signals, which were A/D-converted by the A/D convertor 212 and stored in the memory 215, are converted into analog signals by the D/A convertor 216, and sequentially transferred to the display unit 108 and the EVF 217. The display unit 108 and the EVF 217 perform live view display by displaying the sequentially transferred analog signals.

The system control unit 50 is a control unit constituted of at least one processor and/or at least one circuit. In other words, the system control unit 50 may be a processor, or a circuit, or a combination of a processor and a circuit. The system control unit 50 controls the camera 100 in general. The system control unit 50 implements each processing step of the later mentioned flow chart by executing programs stored in a non-volatile memory 219. The system control unit 50 also performs display control by controlling the memory 215, the D/A convertor 216, the display unit 108, the EVF 217, and the like.

The camera 100 further includes a system memory 218, the non-volatile memory 219, a system timer 220, a communication unit 221, an attitude detection unit 222, and the eye approach detection unit 118.

RAM is used for the system memory 218, for example. In the system memory 218, constants and variables for operating the system control unit 50, programs read from the non-volatile memory 219 and the like are developed. The non-volatile memory 219 is an electrically erasable/recordable memory, and an EEPROM is used for the non-volatile memory 219, for example. In the non-volatile memory 219, constants, programs, and the like for operation of the system control unit 50 are stored. "Programs" here refers to programs for executing the later mentioned flow charts. The system timer 220 is a timer unit to measure the time used for various controls, and to measure the time of the internal clock. The communication unit 221 performs transmission/reception of video signals and audio signals with external apparatuses connected wirelessly or via cable. The communication unit 221 is also connectable to a wireless local area network (LAN) or Internet. Further, the communication unit 221 is communicable with an external apparatus via Bluetooth® or Bluetooth Low Energy. The communication unit 221 can send an image (including a live image) captured by the imaging unit 211 and an image recorded in the recording medium 227, and can receive images and various other information from an external apparatus. The attitude detection unit 222 detects an attitude (inclination) of the camera 100 with respect to the gravity direction. Based on the attitude detected by the attitude detection unit 222, the inclination angle of the camera 100 in the horizontal direction (left-right direction) or vertical direction (top-bottom direction; front-back direction) can be detected. Furthermore, based on the attitude detected by the attitude detection unit 222, it can be determined whether the image captured by the imaging unit 211 is an image captured by the camera 100 held horizontally, or an image captured by the camera 100 held vertically. The system control unit 50 can attach the orientation information, in accordance with the attitude detected by the attitude detection unit 222, to an image file of an image captured by the imaging unit 211, or can rotate the image in accordance with the detected attitude. The attitude detection unit 222 can also detect the motion of the camera 100 (e.g. pan, tilt, lift, remain still). For the attitude detection unit 222, an acceleration sensor, a gyro sensor or the like can be used, for example.

The eye approach detection unit 118 can detect approach of a certain object to the eyepiece 116 (eyepiece finder 117). For the eye approach detection unit 118, an infrared proximity sensor can be used, for example. In a case where an object is approaching, the infrared light emitted from the emitting portion of the eye approach detection unit 118 is reflected by the object, and is received by the receiving portion of the infrared proximity sensor. The eye approach detection unit 118 can determine the distance from the eyepiece 116 to the object by the amount of infrared light that is received. Thus the eye approach detection unit 118 performs eye approach detection that detects the distance of the approach of an object to the eyepiece 116. The eye approach detection unit 118 is an eye approach detection sensor that detects approach (contact) of an object (eye) to the eyepiece 116, and distancing (releasing) of the object (eye) from the eyepiece 116. The eye approach detection unit 118 detects approach of an eye in a case where an object approaching the eyepiece 116 within a predetermined distance from the eyepiece 116, from the non-eye contact state (non-eye approach state) is detected. The eye approach detection unit 118 detects distancing of an eye in a case where an object of which approach was detected distances more than a predetermined distance, from the eye contact state (eye approach state). The threshold to detect approach of an eye and the threshold to detect distancing of an eye may be differentiated by setting hysteresis, for example. Here it is assumed that the eye approach state is from detection of eye approach to detection of eye distancing. It is also assumed that the non-eye approach state is from detection of eye distancing to detection of eye approach. The system control unit 50 switches display (display state)/non-display (non-display state) of the display unit 108 and the EVF 217 in accordance with the state detected by the eye approach detection unit 118. Specifically, in a case where the state is at least the image capturing standby state and the display destination switching setting is automatic switching, the system control unit 50 turns the display of the display unit 108 ON, as the display destination, during non-eye approach state, and turns the display of the EVF 217 OFF. During eye approaching, the system control unit 50 turns the display of the EVF 217 ON, and turns the display of the display unit 108 OFF. The eye approach detection unit 118 is not limited to the infrared proximity sensor, and may be another sensor if the state of eye approach can be detected.

The camera 100 also includes the outer finder display unit 107, an outer finder display driving circuit 223, a power supply control unit 224, a power supply unit 225, a recording medium I/F 226, an operation unit 228, and the like.

The outer finder display unit 107 is driven by the outer finder display driving circuit 223, and displays various set values of the camera 100, such as shutter speed and aperture. The power supply control unit 224 is constituted of a battery detection circuit, a DC-DC convertor, a switch circuit to select a block to energize, and the like, and detects whether a battery is installed or not, a type of battery, and a residual amount of battery. The power supply control unit 224 also controls the DC-DC convertor based on this detection result and instructions received from the system control unit 50, and supplies the required voltage to each unit, including the recording medium 227, for a required period of time. The power supply unit 225 is constituted of a primary battery (e.g. alkali battery, lithium battery), a secondary battery (e.g. NiCd battery, NiMH battery, Li battery), an AC adapter, and the like. The recording medium I/F 226 is an interface with a recording medium 227, such as a memory card and a hard disk. The recording medium 227 is a memory card, for example, to record captured images, and is constituted of a semiconductor memory, a magnetic disk, or the like. The recording medium 227 may be detachable from the camera 100, or may be embedded in the camera 100.

The operation unit 228 is an input unit to receive an operation from the user (user operation), and is used to input various instructions to the system control unit 50. The operation unit 228 includes the shutter button 101, the power supply switch 102, the mode selecting switch 103, the touch panel 109 and other operation units 229. The other operation units 229 are: the main electronic dial 104, the sub-electronic dial 105, the moving image button 106, the direction key 110, the SET button 111, the AE lock button 112, the magnifying button 113, the reproduction button 114, the menu button 115, the touch bar 119, and the like.

The shutter button 101 includes a first shutter switch 230 and a second shutter switch 231. The first shutter switch 230 turns ON in mid-operation of the shutter button 101, that is, in the half-depressed state (image capturing preparation instruction), and outputs a first shutter switch signal SW1. In accordance with the first shutter switch signal SW1, the system control unit 50 starts such image capturing preparation processing as the AF processing, AE processing, AWB processing and EF processing. The second shutter switch 231 turns ON when operation of the shutter button 101 is completed, that is, in the fully depressed state (image capturing instruction), and outputs a second shutter switch signal SW2. In accordance with the second shutter switch signal SW2, the system control unit 50 starts a series of image capturing processing, from a step of reading signals from the imaging unit 211, to a step of generating an image file including the captured image, and writing the image file to the recording medium 227.

The mode selecting switch 103 switches the operation mode of the system control unit 50 to one of a still image capturing mode, a moving image capturing mode, a reproduction mode, and the like. The still image capturing mode includes: an auto image capturing mode, an auto scene determining mode, a manual mode, an aperture priority mode (Av mode), a shutter speed priority mode (Tv mode), and a program AE mode (P mode). The still image capturing mode also includes various scene modes in which image capturing setting is performed for each image capturing scene and a custom mode. If the mode selecting switch 103 is used, the user can directly switch the operation mode to one of the above mentioned image capturing modes. The user may select an image capturing mode list screen first using the mode selecting switch 103, then select one of a plurality of modes displayed thereon, using the operation unit 228. In the same manner, the moving image capturing mode may include a plurality of modes.

The touch panel 109 is a touch sensor to detect various touch operations on the display surface of the display unit 108 (operation surface of the touch panel 109). The touch panel 109 and the display unit 108 may be integrated. For example, the touch panel 109 is disposed on an upper layer of the display surface of the display unit 108, so that the transmittance of the light does not interrupt display of the display unit 108. Then the input coordinates of the touch panel 109 are corresponded with the display coordinates on the display surface of the display unit 108. Thereby a graphical user interface (GUI), as if the user can directly operate the screen displayed on the display unit 108, can be provided. The touch panel 109 may be any one of various types, such as a resistive film type, an electrostatic capacitive type, a surface acoustic wave type, an infrared type, an electromagnetic induction type, an image recognition type, and a photosensor type. Some types detect touch when the touch panel 109 is actually contacted, while other types detect touch when a finger or a pen approaches the touch panel 109, but either type may be used.

The system control unit 50 can detect the following operations on the touch panel 109 or states thereof.

A finger or a pen which does not touch the touch panel 109 initially touches the touch panel 109, that is, the start of touch (hereafter Touch-Down)

A finger or a pen is touching the touch panel 109 (hereafter Touch-On)

A finger or a pen is moving on the touch panel 109 in the touched state (hereafter Touch-Move)

A finger or a pen touching the touch panel 109 is separated (released) from the touch panel 109, that is, the end of touch (hereafter Touch-Up)

Nothing is touching the touch panel 109 (hereafter Touch-Off)

When Touch-Down is detected, Touch-On is detected simultaneously. Unless Touch-Up is detected after Touch-Down, Touch-On is continuously detected. When Touch-Move is detected as well, Touch-On is simultaneously detected. Even if Touch-On is detected, Touch-Move is not detected unless the touch position is moving. When Touch-Up of the finger and the pen is detected, Touch-Off is detected.

These operations/states and coordinates of the positions on the touch panel 109, where the finger or the pen is touching, are notified to the system control unit 50 via the internal bus. Based on the notified information, the system control unit 50 determines which operation (touch operation) was performed on the touch panel 109. For Touch-Move, the moving direction of the finger or the pen moving on the touch panel 109 can also be determined for the vertical component and the horizontal component on the touch panel 109 respectively, based on the change of the position coordinates. In the case where Touch-Move is detected for at least a predetermined distance, the system control unit 50 determines that the slide operation was performed. An operation of quickly moving a fingertip touching the touch panel 109 and releasing the fingertip from the touch panel 109 is called a "flick". In other words, flick is an operation of quickly moving (flicking) the fingertip on the touch panel 109. In a case where Touch-Move is detected for at least a predetermined distance at a predetermined speed, and Touch-Up is detected thereafter, it is determined that flick was performed (it is determined that flick occurred immediately after the slide operation). A touch operation of touching a plurality of locations (e.g. two points) simultaneously (multi-touch) and moving these touch positions close to each other is called "Pinch-In", and the touch operation of moving these positions away from each other is called a "Pinch-Out". Pinch-In and Pinch-Out are collectively called a "pinch operation" (or simply a "pinch").

Figure 3:
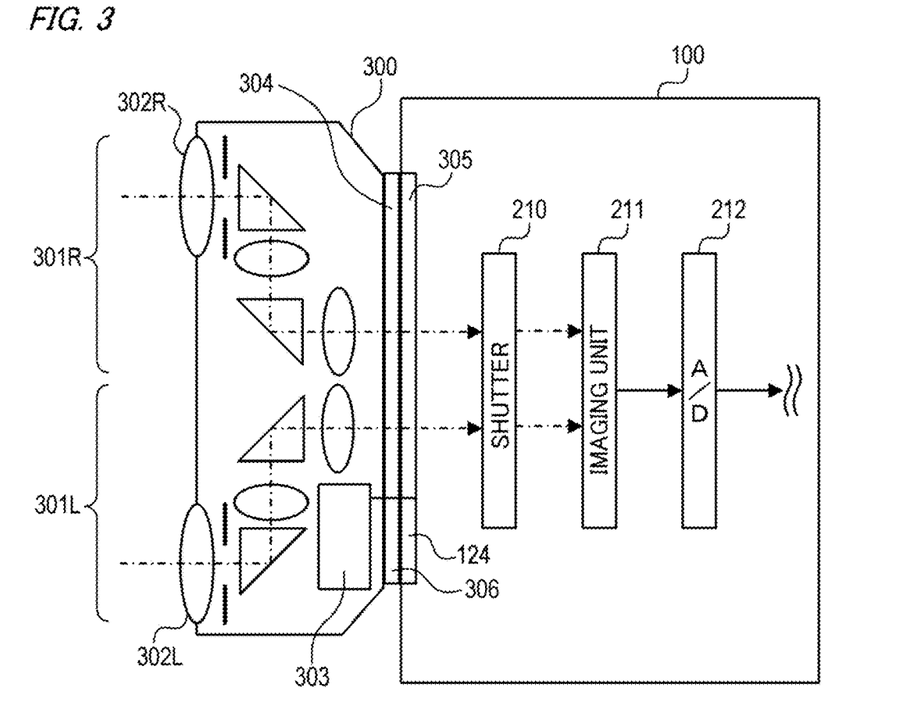
FIG. 3 is a schematic diagram depicting a configuration of a lens unit.

<Configuration of Lens Unit> FIG. 3 is a schematic diagram depicting a configuration of a lens unit 300. FIG. 3 indicates a state where the lens unit 300 is installed in the camera 100. By installing the lens unit 300, the camera 100 can capture an image (still image or moving image), which includes two image regions having predetermined parallax. In the configuration of the camera 100 depicted in FIG. 3, a composing element the same as a composing element described in FIG. 2 is denoted with the same reference sign as FIG. 2, and description of this composing element may be omitted unless necessary.

The lens unit 300 is a type of interchangeable lens unit that is detachable from the camera 100. The lens unit 300 is a dual lens unit that can capture a right image and a left image having parallax. The lens unit 300 includes two optical systems (image capturing lenses), and each of the two optical systems can capture an image in the range of approximately a 180° viewing angle. Specifically, each of the two optical systems of the lens unit 300 can capture an image of a subject in a visual field range (in a viewing angle range) of 180° in the lateral direction (horizontal angle, azimuth angle, yaw angle), and 180° in the longitudinal direction (vertical angle, elevation angle, pitch angle) respectively. In other words, each of the two optical systems can capture an image in a front hemispheric range respectively.

The lens unit 300 is constituted of: a right eye optical system 301R which includes a plurality of lenses, a reflection mirror, and the like; a left eye optical system 301L which includes a plurality of lenses, a reflection mirror, and the like; and a lens system control circuit 303. The right eye optical system 301R includes a lens 302R which is disposed on the subject side, and the left eye optical system 301L includes a lens 302L which is disposed on the subject side. The lens 302R and the lens 302L face the same direction, and optical axes thereof are approximately parallel. Each of the right eye optical system 301R and the left eye optical system 301L has a fisheye lens, and forms a circular optical image on the imaging unit 211 respectively. An optical image (right image) generated by the right eye optical system 301R and an optical image (left image) generated by the left eye optical system 301L are formed on the imaging surface of one imaging unit 211, and the imaging unit 211 acquires one image which includes image regions of these optical images.

The lens unit 300 is a dual lens unit (VR 180 lens unit) to acquire an image of VR 180, which is one of the formats of a virtual reality (VR) image with which two lens stereoscopic viewing is possible. Each of the right eye optical system 301R and the left eye optical system 301L of the lens unit 300 has a fisheye lens which can capture an approximately 180° range. The range that can be captured by each lens of the right eye optical system 301R and the left eye optical system 301L may be slightly narrower than 180°, such as 160°. The lens unit 300 can form a right image, which is generated by the right eye optical system 301R, and a left image, which is generated by the left eye optical system 301L, on one or two image pickup elements of the camera in which the lens unit 300 is installed. In the camera 100, the right image and the left image are formed on one image pickup element (image sensor), and one image (dual lens image), where a right image region corresponding to the right image and a left image region corresponding to the left image are disposed side by side, is generated. The dual lens image includes the right image region, the left image region, and a region that does not correspond to the optical image (non-image region, such as a black region).

The lens unit 300 is installed in the camera 100 via a lens mount unit 304 and a camera mount unit 305 of the camera 100. Thereby via the communication terminal 124 of the camera 100 and the communication terminal 306 of the lens unit 300, the system control unit 50 of the camera 100 and the lens system control circuit 303 of the lens unit 300 are electrically connected.

In FIG. 3, the right image generated by the right eye optical system 301R and the left image generated by the left eye optical system 301L are formed on the imaging unit 211 of the camera 100 side by side. In other words, two optical images are formed on two regions of one image pickup element (image sensor) by the right eye optical system 301R and the left eye optical system 301L respectively. The imaging unit 211 converts the formed subject images (light signals) into analog electric signals. By using the lens unit 300 (the right eye optical system 301R and the left eye optical system 301L) like this, one image (dual lens image), including the two image regions having parallax, can be acquired. The acquired image is divided into an image for the left eye and an image for the right eye, and these images are VR-displayed, whereby the user can view a stereoscopic VR image in an approximately 180° range. In other words, the user can view the stereoscopic image by VR 180.

Here the VR image is a later mentioned image that can be VR-displayed. The VR image includes an omnidirectional image captured by an omnidirectional camera, and a panoramic image having an image range (effective image range) that is wider than a display range that can be displayed on the display unit all at once. The VR image is not limited to a still image, but also includes a moving image and a live image (image captured by the camera in near real-time). The VR image has an image range (effective image range) of which visual field range is at the maximum a 360° horizontal direction and a 360° vertical direction. The VR image also includes an image having a viewing angle wider than a viewing angle that can be captured by a standard camera, or an image having an image range wider than the display range that can be displayed on the display unit all at once, even if the visual field range is less than 360° in the horizontal direction and less than 360° in the vertical direction. An image captured by the camera 100 using the above mentioned lens unit 300 is a type of a VR image. The VR image can be VR-displayed by setting the display mode of the display device (display device that can display a VR image) to "VR view". If a part of the range of the VR image having a 360° viewing angle is displayed, and the user changes the attitude of the display device horizontally (in the horizontal rotating direction), the display range can be moved, and an omnidirectional image that is seamless in the horizontal direction can be viewed.

VR display (VR view) is a display method (display mode) that displays an image of the visual field range in accordance with the attitude of the display device out of the VR image, and can change the display range. The VR display includes a "single lens VR display (single lens VR view)", which performs transformation (distortion correction) to map the VR image on a virtual sphere, and then displays one image. The VR display also includes a "dual lens VR display (dual lens VR view)", which performs transformation to map the VR image for the left eye and the VR image for the right eye respectively on the virtual spheres, and then displays these images side by side in the left and right regions. By performing the "dual lens VR display" using the VR image for the left eye and the VR image for the right eye having parallax therebetween, these VR images can be stereoscopically viewed. In either case of the VR display, when the user wears the display device, such as a head mounted display (HMD), an image of the visual field range, in accordance with the direction of the face of the user is displayed. For example, at a certain point in time, it is assumed that a VR image in the visual field range is centered at 0° in the horizontal direction (specified azimuth, such as North), and at 90° in the vertical direction (90° from the zenith, that is horizontal) is displayed. If the attitude of the display device is front-back inverted in this state (e.g. display surface is changed from facing South to facing North), the display range of this VR image is changed to the image in the visual field range, centering at 180° in the horizontal direction (opposite azimuth, such as South), and 90° in the vertical direction. In other words, when the user wearing the HMD turns their face from North to South (turns back), the image displayed on the HMD also changes from the image at the North to the image at the South. The VR image captured using the lens unit 300 is an image of the VR 180 (180° image) capturing the approximately 180° range in front, and the image in approximately 180° range in the back does not exist. When the image of the VR 180 like this is being VR-displayed, a blank region is displayed if the attitude of the display device is changed to the side where an image does not exist.

By VR-displaying the VR image like this, the user can experience the sensation (sense of immersion) as if visually being in a VR image (VR space). The method for displaying the VR image is not limited to the method for changing the attitude of the display device. For example, the display range may be moved (scrolled) in accordance with the user operation via the touch panel, the direction button, and the like. Further, in the VR display (in the display mode "VR view"), in addition to changing the display range by changing the attitude, the display range may be moved by Touch-Move on the touch panel, the drag operation using a mouse or the like, and by pressing the direction button, for example. A smartphone mounted on a VR goggles (head mounted adapter) is a type of HMD.

Figure 4:
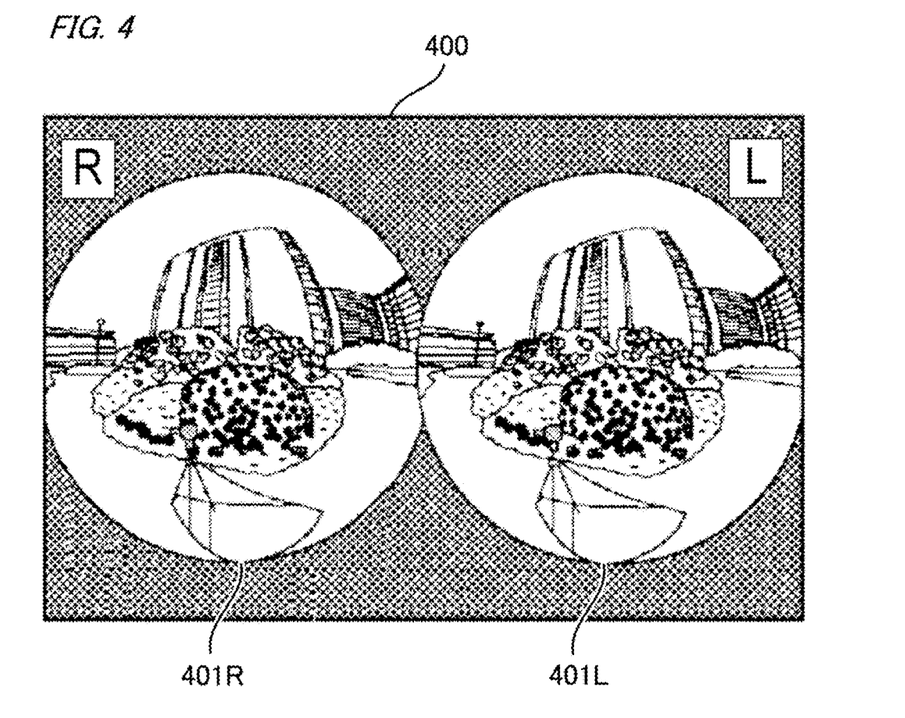
FIG. 4 is a diagram exemplifying a live view image of a dual lens display.

FIG. 4 is a diagram exemplifying a live view image 400 of the dual lens display. The live view image 400 includes a live view image region 401R which corresponds to a live view image captured by the right eye optical system 301R, and a live view image region 401L which corresponds to a live view image captured by the left eye optical system 301L. Each of the live view image region 401R and the live view image region 401L is a circle, and a captured subject is more largely distorted in the direction toward the outer edge of the circle.

Since the dual lens display indicates that two wide angle of view image are being captured by the two optical systems, the user can easily recognize that the lens unit for VR 180 has been installed in the camera 100 and a VR image is being captured in that state. In the case of the dual lens display, however, the two image regions are displayed on one screen, hence the subject is displayed smaller than the case where one image region is displayed. This means that the dual lens display is not suitable for using a function for the user to select a subject by touching the live view screen (e.g. Touch AF, Touch AE).

In Embodiment 1, when the camera 100 receives a predetermined operation performed by the user in the dual lens display, a magnified image region, generated by magnifying a part of one of the image regions, is displayed instead of the other image region. Therefore the camera 100 can display an image which is appropriate for using a function involving subject selection.

The predetermined operation is, for example, an operation on an operation member to which a function to display a magnified image region has been assigned. The predetermined operation may also be a Pinch-Out operation on the live view image region 401R or on the live view image region 401L.

Figure 5:
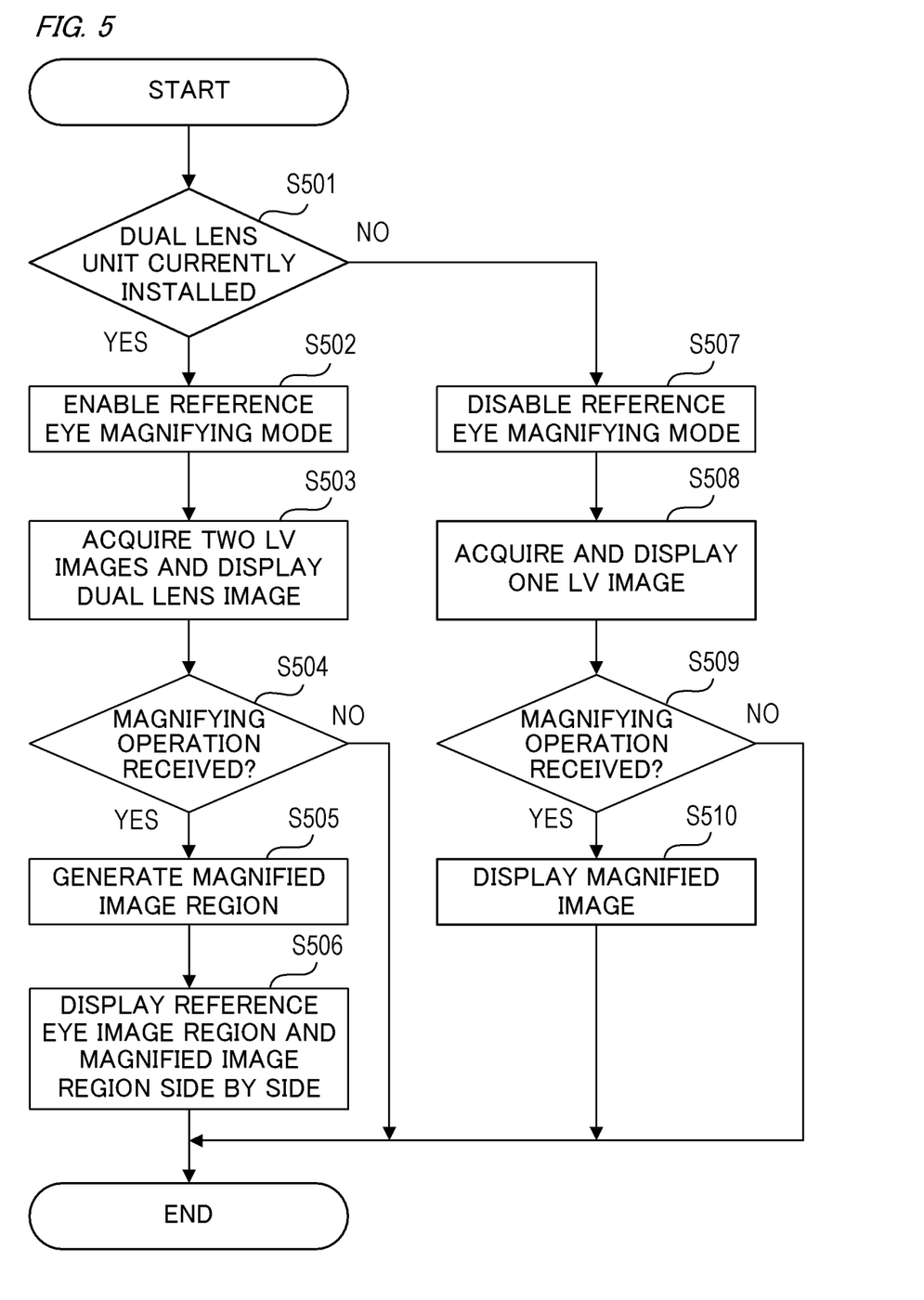
FIG. 5 is a flow chart exemplifying magnified display processing of the camera according to Embodiment 1.

The processing for the camera 100 to magnify and display a live view image will be described next with reference to FIG. 5. FIG. 5 is a flow chart exemplifying a magnified display processing of the camera 100 according to Embodiment 1. The magnified display processing in FIG. 5 is implemented by the system control unit 50 developing a program recorded in the non-volatile memory 219 in the system memory 218, and executing the program. The magnified display processing in FIG. 5 is started when the camera 100 is set to the still image capturing mode or to the moving image capturing mode, and is repeatedly executed at a predetermined time interval until a mode, other than the still image capturing mode and the moving image capturing mode, is selected.

In step S501, the system control unit 50 acquires information on the type of the lens unit installed in the camera 100, and determines whether the dual lens unit 300 is currently installed. In the following description, the dual lens unit 300 is assumed to be a lens unit for VR 180.

The system control unit 50 communicates with the lens unit installed in the camera 100 via the communication terminals 124, 206 and 306, and acquires information on the type of the lens unit from the lens unit thereby. If the lens unit for VR 180 is currently installed in the camera 100, processing advances to step S502. If a lens unit is not installed in the camera 100 or if a single lens unit is currently installed in the camera 100, processing advances to S507.

In step S502, the system control unit 50 enables a reference eye magnifying mode. The reference eye magnifying mode is a mode in which a magnified image region, generated by magnifying a part of an image region corresponding to the reference eye (hereafter also called "reference eye image region"), out of the dual lens displayed image regions, is displayed instead of the other image region. The live view image of the reference eye displayed in the reference eye image region is an image that is used to input such a function as the AF processing and AE processing, and it is set in advance whether the right eye or the left eye is used as the reference eye. The user can change the setting of the right eye or the left eye used as the reference eye. The reference eye is set based on the reference eye of the viewer who views the captured image.

Specifically, to enable the reference eye magnifying mode, gray out of a menu item, which is used for assigning the operation to switch ON/OFF of the reference eye magnifying mode to the magnifying button 113, is cancelled. When the reference eye magnification mode is enabled, the user can set the reference eye magnifying mode.

In the case where the operation to switch ON/OFF of the magnifying mode is assigned to a button (function assigning button) other than the magnifying button 113, the system control unit 50 controls such that the magnifying mode is not turned ON in the state where the reference eye magnifying mode is enabled. In other words, the system control unit 50 controls such that the reference eye magnifying mode and the magnifying mode are not turned ON simultaneously.

In step S503, the system control unit 50 acquires two live view image regions captured by the imaging unit 211 via the lens unit for VR 180, and displays a dual lens image on the display unit 108. The dual lens image is an image in which the live view image region 401R and the live view image region 401L are disposed side by side.

In step S504, the system control unit 50 (receiving unit) determines whether the user performed the magnifying operation to instruct the magnified display of the live view image region. The magnifying operation corresponds to the predetermined operation. Specifically, the magnifying operation is an operation to press the magnifying button 113 to which the operation to switch ON/OFF of the reference eye magnifying mode is assigned, or an operation to press another function assigning button to which the operation to switch ON/OFF of the reference eye magnifying mode is assigned.

The magnifying operation may be the Punch-Out operation performed on the touch panel 109. The Pinch-Out operation may be an operation for the reference eye image region, or an operation for an image region corresponding to the eye that is not the reference eye (hereafter also called "non-reference eye image region"). In other words, in the case where the Pinch-Out operation for the non-reference eye image region is detected as well, the system control unit 50 advances the processing to step S505, and displays the magnified region, generated by magnifying a part of the reference eye image region, along with the reference eye image region.

If the magnifying operation is detected, the system control unit 50 determines that the user performed the operation to magnify the live view image region, and advances the processing to step S505. If the magnifying operation is not detected, the system control unit 50 determines that the user did not perform the magnifying operation, and ends the magnified display processing in FIG. 5.

In step S505, the system control unit 50 generates a magnified image region by magnifying a part of the reference eye image region, out of the two live view image regions acquired in step S503. The live view image displayed on the reference eye image region is an image to be input each function, such as the AF processing and AE processing. In the reference eye image region, the range of the region to be a target of the magnified display is indicated by enclosing with a magnifying frame.

In step S506, the system control unit 50 displays the reference eye image region corresponding to the reference eye, out of the two live view images acquired in step S503, and the magnified image region generated in step S505, side by side. In other words, the system control unit 50 controls such that the magnified image region is displayed, instead of the non-reference eye image region which was displayed with the reference eye image region side by side.

When the magnified image region is displayed, the user can easily select a subject by the touch operation in the magnified image region. The user may select a subject by the touch operation in the reference eye image region when the magnified image region is displayed.

Figure 6A:
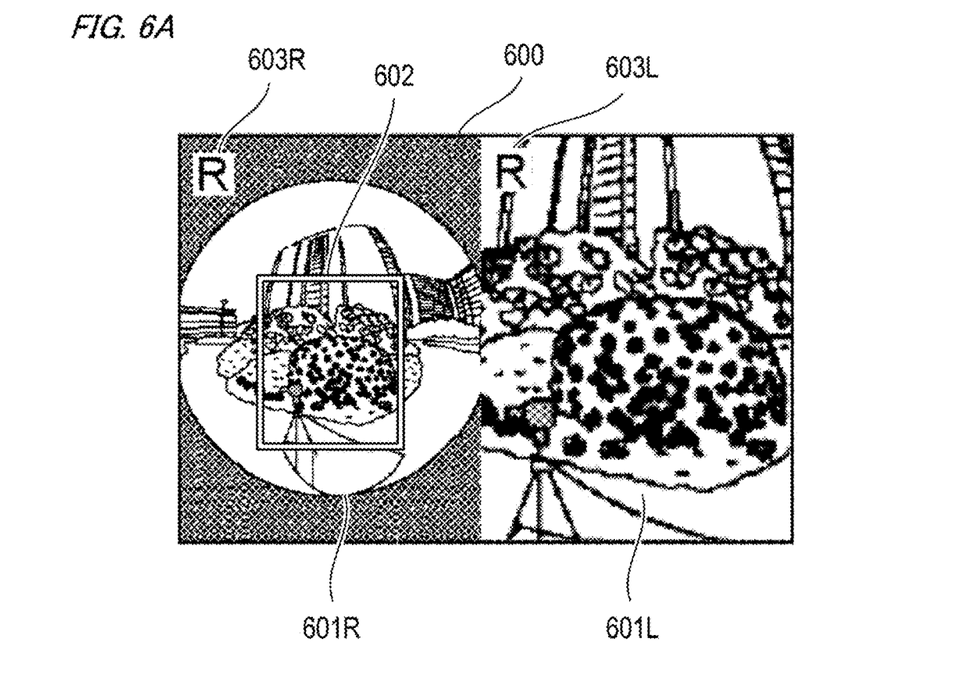
FIGS. 6A to 6D are display examples of a reference eye image region and a magnified display region.

Display examples of the reference eye image region and the magnified image region will be described with reference to FIGS. 6A to 6D. FIG. 6A is an example where a rectangular-shaped magnified image region 601L, clipped from a reference eye image region 601R in accordance with the shape of the display unit 108, is displayed with the reference eye image region 601R side by side. A live view image 600 includes the reference eye image region 601R acquired in step S503, and the magnified image region 601L generated in step S505. The magnified image region 601L is an image region generated by magnifying a range enclosed by a magnifying frame 602 displayed in the reference eye image region 601R.

In the reference eye image region 601R, the magnifying frame 602 is a frame indicating a region displayed in the magnified image region 601L. In the case where the reference eye image region 601R and the magnified image region 601L are displayed side by side, the magnifying frame 602 is displayed superimposed on the reference eye image region 601R.

Items (guide 603R and guide 603L), which indicate the optical system (left eye optical system or right eye optical system) used for capturing an image, may be displayed for the reference eye image region 601R and the magnified image region 601L respectively. The guide 603R and the guide 603L may be displayed at a position adjacent to the reference eye image region 601R, as in the case of 603R, or may be displayed superimposed on the magnified image region 601L, as in the case of the guide 603L. In the example in FIG. 6A, the reference eye image region 601R was captured by the right eye optical system, hence the guide 603R indicates "R". The magnified image region 601L was a region generated by magnifying the reference eye image region 601R captured by the right eye optical system, hence the guide 603L indicates "R".

In the case where the reference eye image region 601R and the magnified image region 601L are displayed, the touch operation to select a subject, such as the Touch AF and Touch AE, can be performed in either image region.

If the Pinch-Out or Pinch-In operation is performed on the touch panel 109 in a state where the reference eye image region 601R and the magnified image region 601 L are displayed side by side, the system control unit 50 may change the magnification ratio of the magnified image region 601L. When the magnification ratio of the magnified image region 601L is changed, the system control unit 50 changes the size and position of the magnifying frame 602, so as to indicate the imaging range of the magnified image region 601L, and displays the magnifying frame 602 superimposed on the reference eye image region 601R. It does not matter whether the Pinch-Out or the Pinch-In operation is an operation on the reference eye image region 601R or an operation on the magnified image region 601L.

The shape and size of the magnifying frame 602 are not limited to those of the example in FIG. 6A. The shape of the magnifying frame 602 may be, for example, an ellipse enclosing a region corresponding to the magnified image region 601L. The size of the magnifying frame 602 may be changed in accordance with the magnification ratio of the magnified image region 601L.

Figure 6B:
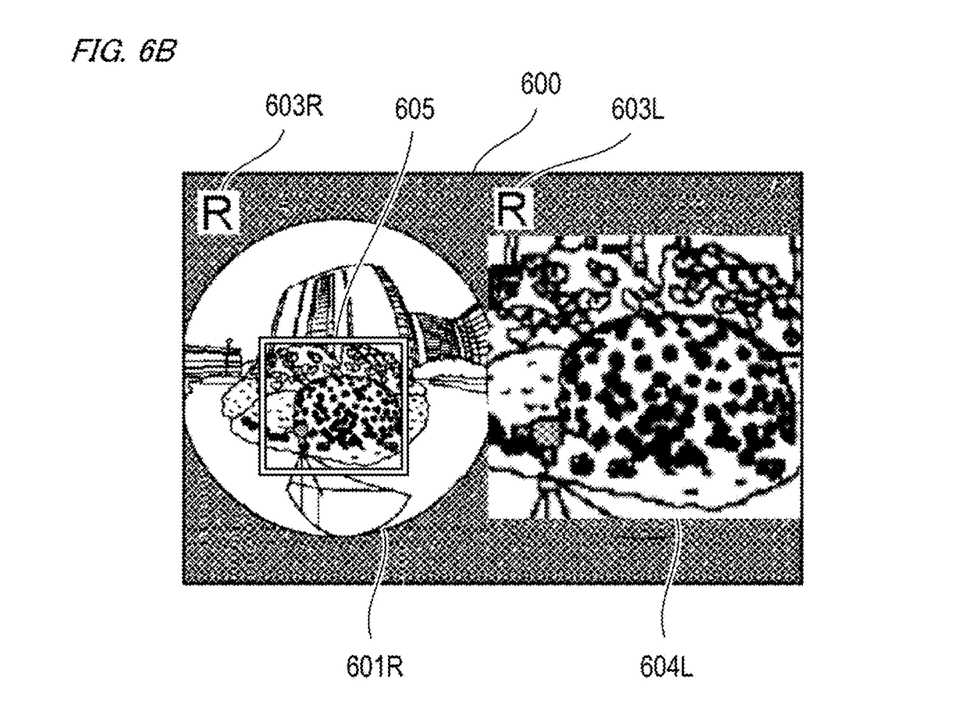

FIG. 6B is an example where the magnified image region 604L, generated by magnifying a range enclosed by the square-shaped magnifying frame 605, is displayed with the reference eye image region 601R. The magnified image region 604L is generated to have a same shape as the magnifying frame 605. If the magnified image region 604L is displayed instead of the non-reference eye image region, the region excluding the reference eye image region 601R and the magnified image region 604L are displayed in black, for example.

Figure 6C:
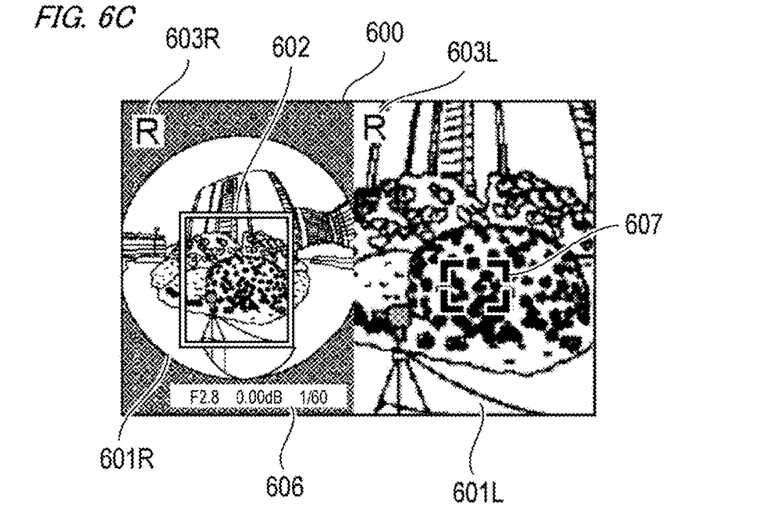

FIG. 6C is an example where various information is displayed on an on-screen display (OSD) in addition to the same display as FIG. 6A. An OSD display 606 includes information not related to the subject selection operation, such as an F value, gain, and shutter speed, and is displayed superimposed on the reference eye image region 601R. An OSD display 607, on the other hand, includes information related to the subject selection operation, such as an AF frame, an AE frame, and a tracking frame, and is displayed superimposed on the magnified image region 601L. By superimposing only the OSD display 607 related to the subject selection operation on the magnified image region 601L, the user can concentrate on the subject selection operation in a state where unnecessary information is eliminated from the visual field.

Figure 6D:
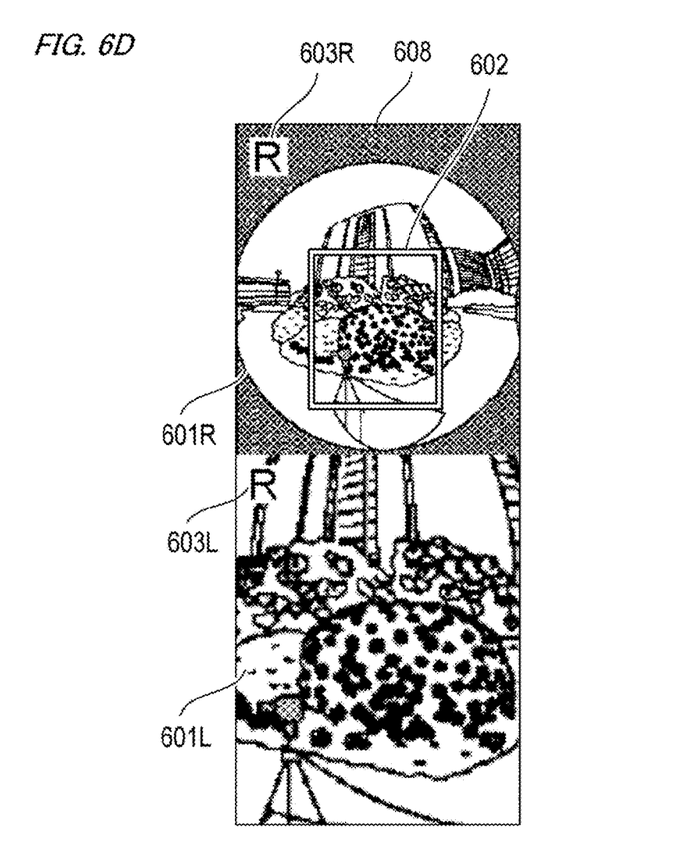

FIG. 6D is an example where the magnified image region 601L and the reference eye image region 601R are displayed aligned in the vertical direction when the display region of the live view image is vertically long. The display region may become vertically long in the case where the live view image captured by the camera 100 is displayed on such a remote terminal as a smartphone. If the display region is vertically long and the reference eye image region 601R and the magnified image region 601L are disposed side by side in the horizontal direction, each region is displayed smaller than the case of disposing these regions aligned in the vertical direction, which makes it difficult for the user to select a subject.

Therefore in a camera 100, a smartphone, or the like, having a vertically long display region, it is preferable that the reference eye image region 601R and the magnified image region 601L are displayed aligned in the vertical direction, as indicated in the live view image 608 in FIG. 6D. In this way, the system control unit 50 switches whether the reference eye image region 601R and the magnified image region 601L are displayed aligned in the vertical direction, or displayed side by side in the horizontal direction based on the aspect ratio of the display unit 108.

In step S507 in FIG. 5, the system control unit 50 disables the reference eye magnifying mode. Specifically, to disable the reference eye magnifying mode, the menu item, to assign the operation to switch ON/OFF of the reference eye magnifying mode to the magnifying button 113, is grayed out. When the reference eye magnifying mode is disabled, the reference eye magnifying mode is controlled not to be set.

The display of the magnified image region 601L is cleared by pressing such an operation member as the magnifying button 113, to which the function to display the magnified image region is assigned. The display of the magnified image region 601L is also cleared by clearing the assignment of the function to display the magnified image region to the magnifying button 113 or the like, or by disabling the reference eye magnifying mode. When the display of the magnified image region 601L is cleared, the system control unit 50 displays a dual lens image, which includes the reference eye image region and the non-reference eye image region.

In step S508, the system control unit 50 acquires a live view image captured by the imaging unit 211 via the single lens unit, and live view-displays the live view image on the display unit 108.

In step S509, the system control unit 50 determines whether the user performed the magnifying operation to instruct the magnified display of the live view image. Specifically, the magnifying operation when the single lens unit is installed is an operation in which the magnifying button 113 is pressed. The magnifying operation may also be the Pinch-Out operation on the touch panel 109. If the magnifying operation is detected, the system control unit 50 determines that the user performed the magnifying operation to magnify the live view image region, and advances the processing to step S510. If the magnifying operation is not detected, the system control unit 50 determines that the user did not perform the magnifying operation, and ends the magnified display processing in FIG. 5.

In step S510, the system control unit 50 magnifies a part of the live view image acquired in step S508, and displays the magnified image.

In Embodiment 1, when a predetermined operation performed by the user is received during the dual lens display, the camera 100 displays the reference eye image region and the magnified image region, generated by magnifying a part of the reference eye image region, side by side. Then the user can more easily select a subject in the magnified image region even if the display region is limited. Furthermore, the magnifying frame, which indicates a region corresponding to the magnified image region, is displayed superimposed on the reference eye image region, whereby the user can easily determine the position in the entire image capturing range where the magnified image region is located. As described above, the camera 100 can perform image display appropriate for the use of the function involving subject selection.

Embodiment 2

In Embodiment 1, when the magnifying operation to instruct the magnified display is received from the user, the camera 100 displays the reference eye image region and the magnified image region side by side. Whereas in Embodiment 2, when the function involving subject selection, such as the Touch AF or Touch AE, is enabled, the camera 100 displays the reference eye image region and the magnified image region side by side. In Embodiment 2, the predetermined operation is an operation to enable the function involving subject selection. The configuration of the camera 100, the display examples of the live view image, and the like described with reference to FIGS. 1A and 1B to FIG. 4 are the same as Embodiment 1, hence description thereof will be omitted.

Figure 7:
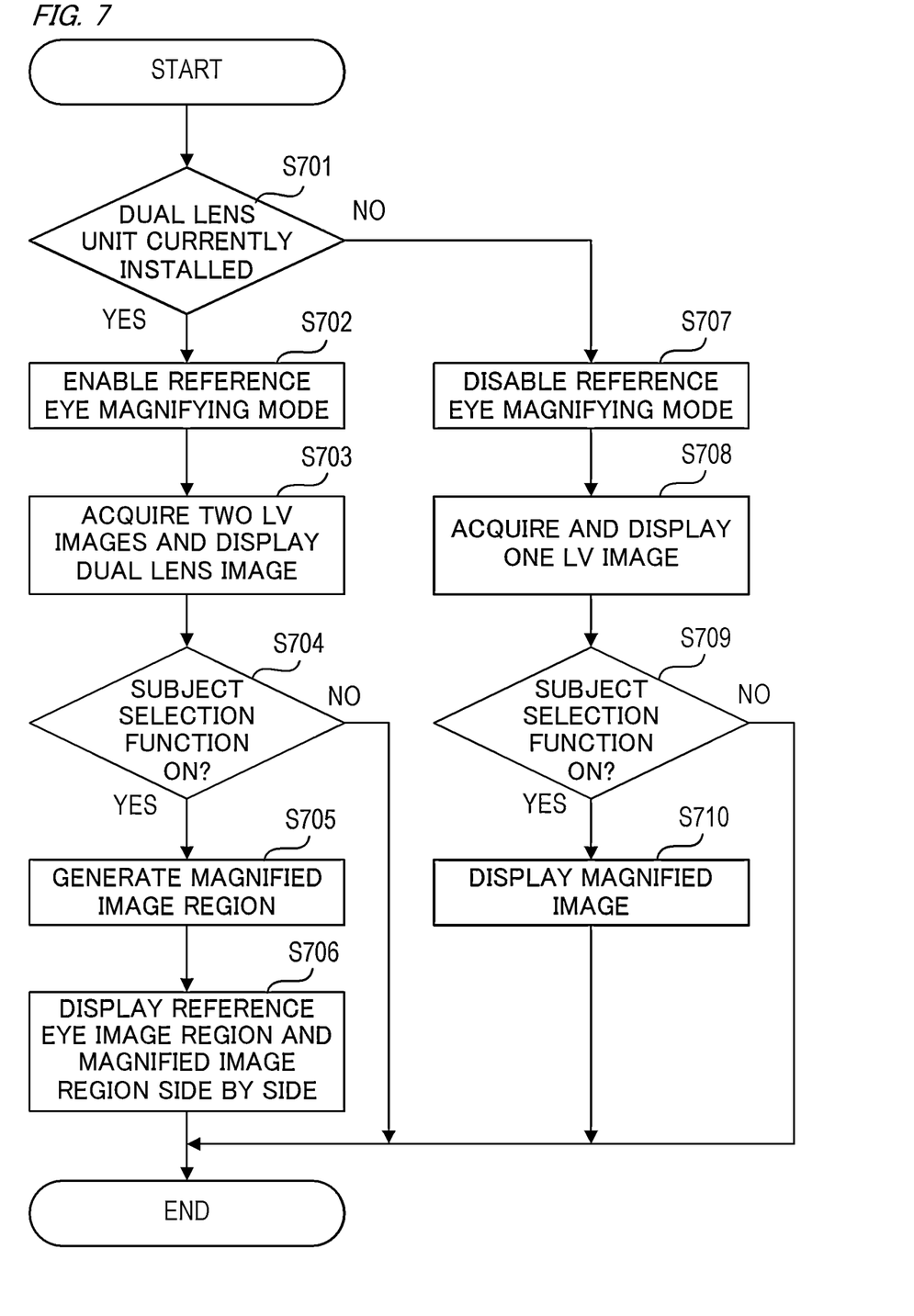
FIG. 7 is a flow chart exemplifying magnified display processing of a camera according to Embodiment 2.

FIG. 7 is a flow chart exemplifying the magnified display processing of the camera 100 according to Embodiment 2. The magnified display processing in FIG. 7 is started when the camera 100 is set to the still image capturing mode or the moving image capturing mode, and is repeatedly executed at a predetermined time interval until a mode, other than the still image capturing mode and the moving image capturing mode, is selected. The processing steps S701 to S703 are the same as the processing steps S501 to S503 of Embodiment 1.

In step S704, the system control unit 50 determines whether the function involving subject selection, such as the Touch AF or Touch AE, is set to ON. Processing advances to step S705 if the function involving subject selection is set to ON, or the processing in FIG. 7 ends if the function involving subject selection is not set to ON.

Processing steps S705 to S710 are the same as processing steps S505 to S510 in Embodiment 1. The display of the magnified image region is cleared when the function involving subject selection is set to OFF, and the system control unit 50 displays a dual lens image which includes the reference eye image region and the non-reference eye image region.

In Embodiment 2, when the function involving subject selection, such as the Touch AF and Touch AE, is set to ON, the camera 100 displays the reference eye image region and the magnified image region side by side. Therefore once the user sets the function involving subject selection to ON, the magnified image region can be displayed without executing any additional operations.

While the present invention has been described with reference to the preferred embodiments thereof, the present invention is not limited to these specified embodiments, and various modes within the scope of not departing from the spirit of the invention are also included in the present invention. The above embodiments may be partially combined.

The present invention also includes a case where software programs to implement the functions of the above embodiments are supplied to a system or an apparatus having a computer that can execute the programs, directly from a recording medium or via a cable/wireless communication, and the programs are executed thereby. Therefore program codes to be supplied to and installed on a computer, to implement the functional processing of the present invention using the computer, also implement the present invention. In other words, the computer programs to implement the functional processing of the present invention are also included in the present invention. In this case, the formats of the programs do not matter, such as object codes, programs executed by an interpreter, and script data to be supplied to the OS, as long as the program codes have the above mentioned functions of the programs.

The recording medium to supply the programs may be, for example, a hard disk, a magnetic recording medium (e.g. magnetic tape), an optical/magneto optical recording medium, a non-volatile semiconductor memory, or the like. The method for supplying the programs may be, for example, storing computer programs implementing the present invention on a server of a computer network, and a connected client computer downloading the computer programs.

According to the present disclosure, an electronic apparatus that can display an image appropriate for use of the function involving subject selection when the dual lens display is preformed can be provided.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2022-133643, filed on Aug. 24, 2022, which is hereby incorporated by reference herein in its entirety.

What is claimed is:

1. An electronic apparatus comprising:
   a processor; and
   a memory storing a program which, when executed by the processor, causes the electronic apparatus to:
      acquire an image in which a first image region captured by using a first optical system and a second image region captured by using a second optical system are disposed side by side;
      display the first image region and the second image region on a display;
      receive a predetermined operation from a user; and
      in a case where the predetermined operation is received from the user, control such that a magnified image region, generated by magnifying a part of the first image region, is displayed instead of the second image region.

2. The electronic apparatus according to claim 1, wherein the program, when executed by the processor, further causes the electronic apparatus to:
   in a case where the first image region and the magnified image region are displayed side by side, superimpose a frame, which indicates a region displayed in the magnified image region, on the first image region.

3. The electronic apparatus according to claim 1, wherein the first image region is an image region captured by using an optical system corresponding to a right eye or a left eye which is set as a reference eye.

4. The electronic apparatus according to claim 1, wherein the program, when executed by the processor, further causes the electronic apparatus to:
   in a case where the magnified image region is displayed instead of the second image region, control such that a region other than the first image region and the magnified image region becomes black.

5. The electronic apparatus according to claim 1, wherein the program, when executed by the processor, further causes the electronic apparatus to:

in the magnified image region, display such that information related to a subject selection operation is superimposed and information not related to the subject selection operation is not superimposed.

6. The electronic apparatus according to claim 1, wherein the program, when executed by the processor, further causes the electronic apparatus to:
select whether the first image region and the second image region are displayed aligned in a vertical direction or are displayed side by side in a horizontal direction, based on an aspect ratio of the display.

7. The electronic apparatus according to claim 1, wherein the predetermined operation is an operation on an operation member to which a function to display the magnified image region is assigned, a Pinch-Out operation on the first image region or the second image region, or an operation to enable a function involving a subject selection operation.

8. The electronic apparatus according to claim 1, wherein the program, when executed by the processor, further causes the electronic apparatus to:
in a case where a Pinch-In operation or a Pinch-Out operation on the first image region or the magnified image region is received in a state in which the magnified image region is displayed instead of the second image region, change a magnification ratio of the magnified image region based on the Pinch-In or the Pinch-Out operation.

9. The electronic apparatus according to claim 1, wherein the program, when executed by the processor, further causes the electronic apparatus to:
display an item to indicate whether each of the first image region, the second image region and the magnified image region has been captured by the first optical system or by the second optical system, respectively.

10. A control method for an electronic apparatus, comprising:
acquiring an image in which a first image region captured by using a first optical system and a second image region captured by using a second optical system are disposed side by side;
displaying the first image region and the second image region on a display;
receiving a predetermined operation from a user; and
controlling such that a magnified image region, generated by magnifying a part of the first image region, is displayed instead of the second image region, in a case where the predetermined operation is received from the user.

11. A non-transitory computer-readable storage medium storing a program, wherein the program causes an electronic apparatus to execute:
acquiring an image in which a first image region captured by using a first optical system and a second image region captured by using a second optical system are disposed side by side;
displaying the first image region and the second image region on a display;
receiving a predetermined operation from a user; and
controlling such that a magnified image region, generated by magnifying a part of the first image region, is displayed instead of the second image region, in a case where the predetermined operation is received from the user.

* * * * *